(12) United States Patent
Zhilinsky et al.

(10) Patent No.: US 9,841,576 B2
(45) Date of Patent: Dec. 12, 2017

(54) SYSTEM FOR PARALLAX CORRECTION

(71) Applicants: Dmitry Zhilinsky, Richboro, PA (US); Laszlo Kovacs, Whitehouse Station, NJ (US)

(72) Inventors: Dmitry Zhilinsky, Richboro, PA (US); Laszlo Kovacs, Whitehouse Station, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 14/858,491

(22) Filed: Sep. 18, 2015

(65) Prior Publication Data
US 2017/0082822 A1   Mar. 23, 2017

(51) Int. Cl.
*G02B 7/02* (2006.01)
*G02B 7/105* (2006.01)

(52) U.S. Cl.
CPC ............. *G02B 7/021* (2013.01); *G02B 7/105* (2013.01)

(58) Field of Classification Search
USPC ........................................................ 396/114
See application file for complete search history.

(56) References Cited

U.S. PATENT DOCUMENTS

| | | | | |
|---|---|---|---|---|
| 3,914,777 A | * | 10/1975 | Slavitter | G03B 3/00 359/823 |
| 4,281,890 A | * | 8/1981 | Van Exel | G02B 7/06 359/418 |
| 4,329,013 A | * | 5/1982 | Hengst | G02B 23/02 359/418 |
| 4,428,651 A | * | 1/1984 | Calcutt | G02B 7/06 359/418 |
| 4,818,086 A | * | 4/1989 | Moore | G02B 23/18 359/414 |
| 5,063,441 A | | 11/1991 | Lipton et al. | |
| 5,142,312 A | | 8/1992 | Suzuki et al. | |
| 5,210,552 A | * | 5/1993 | Baran | G02C 7/12 351/44 |
| 5,329,325 A | | 7/1994 | McClellan et al. | |
| 5,778,268 A | * | 7/1998 | Inaba | G03B 35/10 396/326 |
| 6,144,809 A | | 11/2000 | Inaba | |
| 6,507,359 B1 | * | 1/2003 | Muramoto | H04N 5/772 345/8 |
| 6,542,294 B2 | * | 4/2003 | Funatsu | G02B 23/18 359/407 |
| 7,706,084 B2 | | 4/2010 | Lin | |
| 2006/0033990 A1 | * | 2/2006 | Kato | G02B 7/06 359/425 |
| 2009/0050806 A1 | * | 2/2009 | Schmidt | H04N 5/2254 250/332 |

(Continued)

*Primary Examiner* — Clayton E Laballe
*Assistant Examiner* — Linda B Smith
(74) *Attorney, Agent, or Firm* — Locke Lord LLP; Scott D. Wofsy; Arpita G. Buesing

(57) ABSTRACT

A system for parallax correction includes a rotatable focus adjuster having a longitudinal axis. A lens retainer is engaged with the focus adjuster. A first lens is housed within the lens retainer aligned with the longitudinal axis. A second lens is positioned parallel to the first lens within the lens retainer. The second lens is configured to move laterally with respect to the first lens to correct for parallax between the first and second lenses.

9 Claims, 2 Drawing Sheets

(56) References Cited

U.S. PATENT DOCUMENTS

| | | | |
|---|---|---|---|
| 2009/0201582 A1* | 8/2009 | Lee | G02B 7/06 |
| | | | 359/410 |
| 2010/0264310 A1 | 10/2010 | Willey | |
| 2012/0098971 A1* | 4/2012 | Hansen | H04N 5/2258 |
| | | | 348/164 |
| 2012/0250153 A1 | 10/2012 | Kawasaki et al. | |
| 2012/0263616 A1* | 10/2012 | Rosenboom | F04B 9/02 |
| | | | 418/81 |

* cited by examiner

SYSTEM FOR PARALLAX CORRECTION

GOVERNMENT RIGHTS STATEMENT

This invention was made with government support under contract number HR0011-13-C-0068 awarded by Defense Advanced Research Projects Agency. The government has certain rights in the invention.

BACKGROUND OF THE INVENTION

1. Field of the Invention

The present disclosure relates to optics, and more particularly to parallax correction between two lenses.

2. Description of Related Art

Night vision systems include image intensification, thermal imaging, and fusion monoculars, binoculars, and goggles, whether hand-held, weapon mounted, or helmet mounted. Infrared imagers allow an operator to see people and objects. With the use of multiple infrared imagers and therefore more than one lens the need for correcting parallax between the lenses exist. Specifically, a remote object can be observed without any problem, because the image of the object is formed substantially at the center of the field of view of each of the right and left optical systems. However, as the object comes closer, its image moves away from the center, and at the extreme, the image of a very close object is formed out of the field of view of each of the optical systems. This problem is due to parallax, and can be solved by various methods. Typical methods which correct for parallax are manual and demand a great deal of time and effort, but also tend to leave small alignment errors, making it difficult to realize the optical performance as designed.

Such conventional methods and systems have generally been considered satisfactory for their intended purpose. However, there is still a need in the art for improved system for parallax correction. The present disclosure provides a solution for this need.

SUMMARY OF THE INVENTION

A system for parallax correction includes a rotatable focus adjuster having a longitudinal axis. A lens retainer is engaged with the focus adjuster. A first lens is housed within the lens retainer aligned with the longitudinal axis. A second lens is positioned parallel to the first lens within the lens retainer. The second lens is configured to move laterally with respect to the first lens to correct for parallax between the first and second lenses.

The focus adjuster can include a set of circumferential threads that engage the lens retainer and are configured to urge the lens retainer along the longitudinal axis towards and away from an object of focus upon rotation of the focus adjuster. The focus adjustor can also include a set of gear teeth that engage gear teeth of the first lens such that rotation of the focus adjustor causes simultaneous rotation of the first lens. The lens retainer can include castellation's that mesh with the gear teeth of the focus adjuster to maintain position of the lens retainer when the focus adjuster is rotated. The gear teeth disposed on the first lens can have a predetermined length to facilitate calibration based on movement of the focus adjuster.

A cam can extend circumferentially about the first lens. The cam can have a profile configured to engage and laterally move the second lens upon rotation of the first lens for parallax correction between the first and second lenses. A spring mechanism can be included between the first and second lens configured to maintain the first and second lenses in parallel with one another.

The gear teeth of the first lens and the threads of the focus adjuster are keyed to each other such that parallax correction between the first and second lenses is keyed to a focal distance of the first and second lenses. The first lens can be a long wave infrared lens and the second lens can be a short wave infrared lens.

A method for correcting for parallax includes rotating a focus adjuster to advance and retract a lens retainer engaged with the focus adjuster towards and away from an object of focus. A first lens within the lens retainer is simultaneously rotated. A second lens positioned parallel to the first lens within the lens retainer is moved laterally to correct for parallax between the first and second lenses. The steps of rotating and laterally moving can include advancing a cam to force lateral movement of the second lens.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
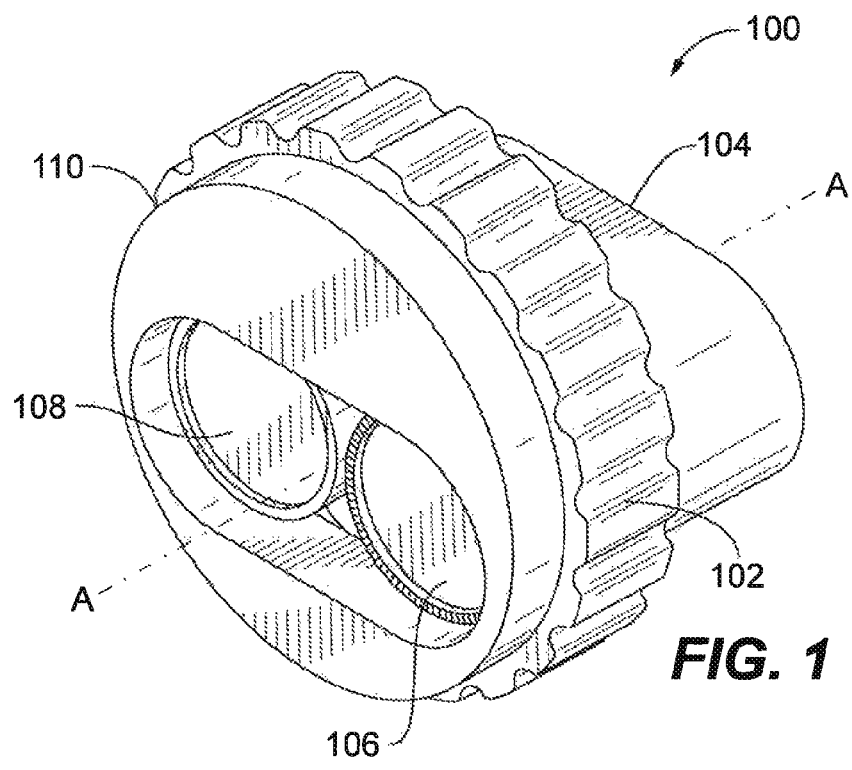
FIG. 1 is a perspective view of an exemplary embodiment of a system for parallax correction constructed in accordance with the present disclosure, showing a focus adjuster and lens retainer housing a first and second lens.
Figure 2:
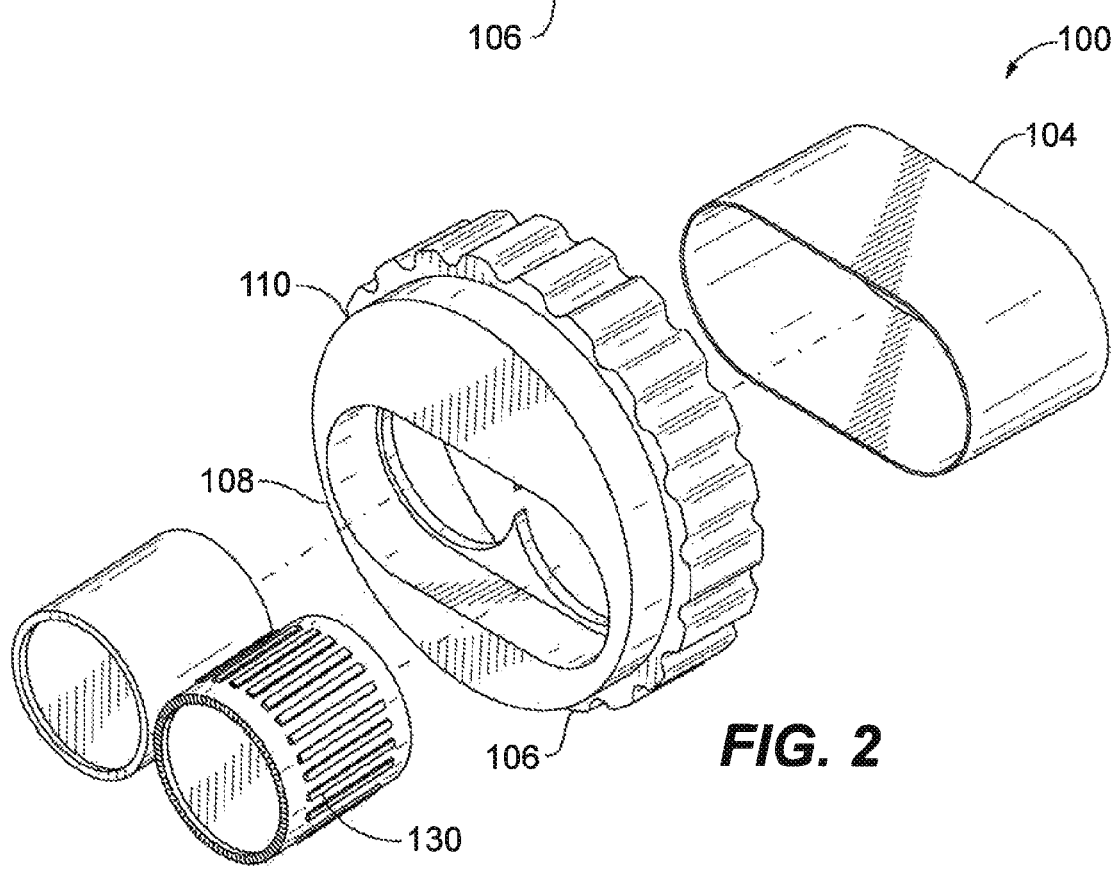
FIG. 2 is an exploded view of the system of parallax correction of FIG. 1, showing threading for movement of the lens retainer.
Figure 3:
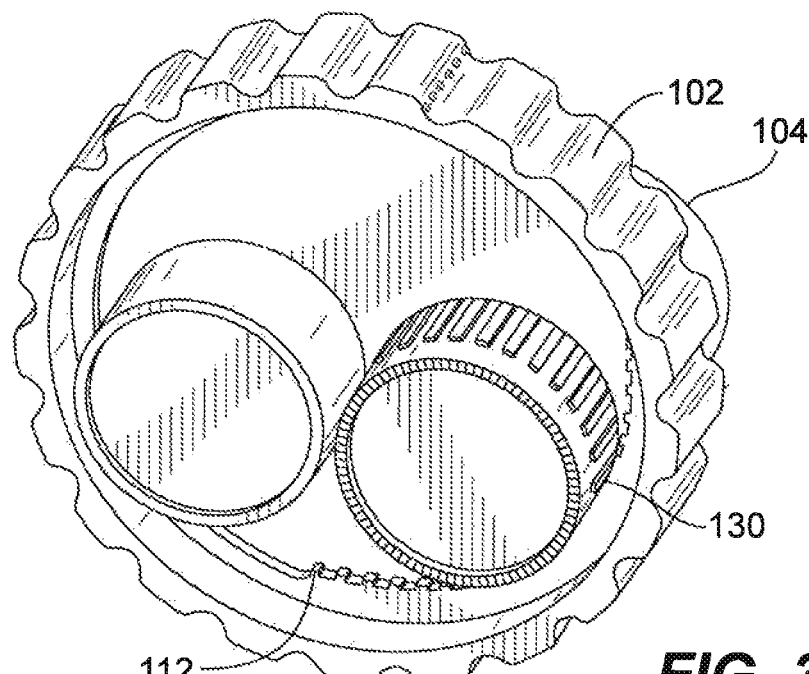
FIG. 3 is a partially cut-away perspective view showing a gear mechanism between the focus adjuster and the first lens.

Reference will now be made to the drawings wherein like reference numerals identify similar structural features or aspects of the subject disclosure. For purposes of explanation and illustration, and not limitation, a partial view of an exemplary embodiment of a system for parallax correction in accordance with the disclosure is shown in FIG. 1 and is designated generally by reference character 100. Other embodiments of the system in accordance with the disclosure, or aspects thereof, are provided in FIGS. 2-4, as will be described. The system and method described herein can be used to correct for parallax between two lenses, e.g., between dual infrared lens such as for long wave infrared and a short wave infrared.

With reference to FIGS. 1-4, a system for parallax correction 100 is shown including a focus adjuster 102 defining a longitudinal axis A-A engaged with a lens retainer 104. A first lens 106 is aligned with the longitudinal access A-A and a second lens 108 is positioned parallel with the first lens 106 within the lens retainer 104. An optional protective cover 110 can be disposed adjacent the focus adjuster 102 surrounding the first and second lenses 106,108. The focus adjuster 102 engages with the lens retainer 104 using a common thread between two pieces. During operation, rotational movement of the focus adjuster 102 by the user urges the lens retainer 104 along the longitudinal axis A-A towards and away from an object of focus. The lens retainer 104 may be externally or otherwise supported to maintain position of the lens retainer 104 when the focus adjuster 102 is rotated. The focus adjuster 102 includes gear teeth 112 that mesh with gear teeth 130 of the first lens 106 to rotate the lens about its axis.

Figure 4:
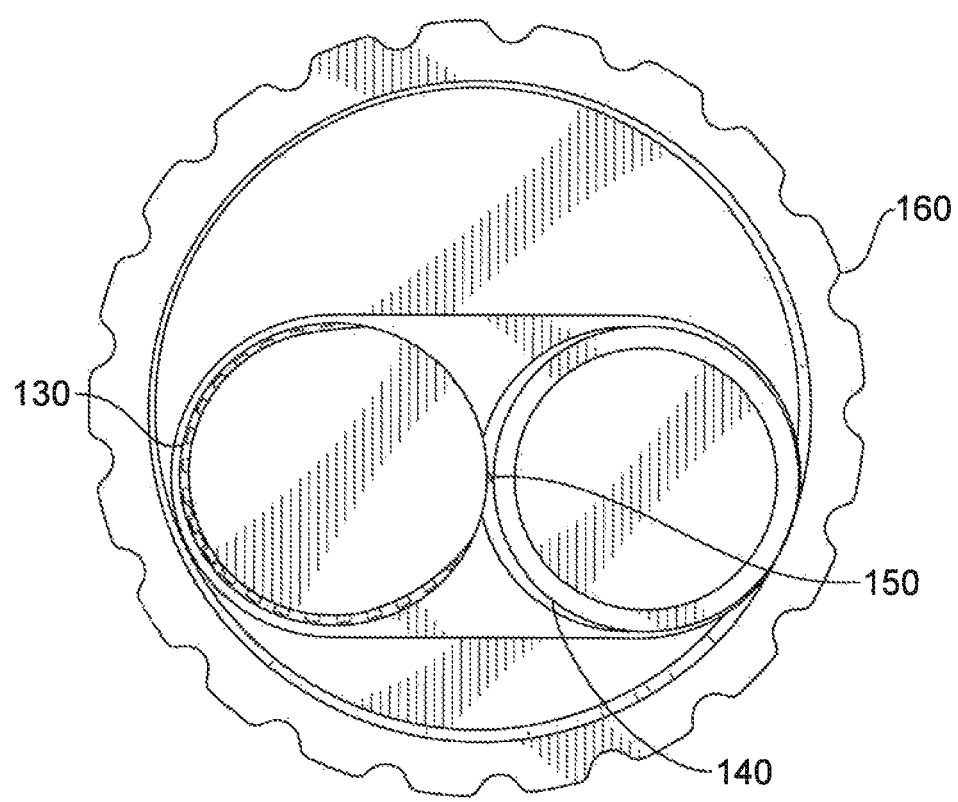
FIG. 4 is a rear view of the system of parallax correction of FIG. 1, showing a cam circumferentially around the first lens.

The first and second lenses 106,108 housed within the lens retainer 104 move in conjunction with the lens retainer 104 along the longitudinal axis A-A changing focus of the first and second lenses 106,108. As the focus adjuster 102 is rotated the first lens 106 rotates simultaneously. As shown in FIG. 4, a cam 140 is positioned extending circumferentially about the first lens 106. Upon rotation of the first lens 106, the cam 140 rotates and causes lateral movement of the second lens 108 to correct for parallax between the first and second lenses 106, 108. In other words, as the user rotates the focus adjuster 102 to focus on an object, the first lens 106 rotates and moves the second lens 108 laterally within the lens retainer 104. This lateral movement of the second lens 108 corrects for parallax between the first and second lenses. The gear teeth 130 of the first lens 106 and threads of the focus adjuster 120 are keyed to a focal distance of each of the first and second lenses 106, 108. Furthermore, the gear teeth 130 of the first lens 106 are predetermined length to facilitate calibration based on movement of the focus adjuster 102. The system 100 includes a spring mechanism 150 between the first and second lens configured to maintain the first and second lenses 106, 108 in parallel with one another.

A method of correcting for parallax between two lenses using the system of FIGS. 1-4 includes rotating a focus adjuster (e.g., focus adjuster 102) engaged with a lens retainer (e.g., lens retainer 104). Rotating of the focus adjuster urges the advancing and retracting of a lens retainer towards and away from an object of focus. The method continues by rotating a first lens (e.g., first lens 106) positioned within the lens retainer. With the step of rotating the first lens a cam (e.g., cam 140) is advanced to force lateral movement of a second lens (e.g., second lens 108) positioned parallel to the first lens to correct for parallax between the first and second lenses.

The methods and systems of the present disclosure, as described above and shown in the drawings, provide for a system for parallax correction with superior properties including laterally displacing at least one of two lenses. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for parallax correction, comprising:
   a rotatable focus adjuster having a longitudinal axis;
   a lens retainer engaged with the rotatable focus adjuster;
   a first lens housed within the lens retainer aligned with the longitudinal axis; and
   a second lens positioned parallel to the first lens within the lens retainer and configured to move laterally with respect to the first lens;
   wherein the focus adjuster includes a set of gear teeth that engages gear teeth of the first lens such that rotation of the focus adjuster causes simultaneous rotation of the first lens and lateral movement of the second lens and wherein rotational movement of the focus adjuster causes the first and second lenses to focus on an object while the simultaneous lateral movement of the second lens corrects for parallax between the first and second lenses; and
   wherein the gear teeth of the first lens are a predetermined length to facilitate calibration movement of the first lens based on movement of the focus adjuster.

2. The system of claim 1, wherein the focus adjuster includes a set of threads that engage the lens retainer and are configured to urge the lens retainer along the longitudinal axis towards and away from an object of focus upon rotation of the focus adjuster.

3. The system of claim 1, wherein the lens retainer includes gear teeth that mesh with the gear teeth of the focus adjuster to maintain position of the lens retainer when the focus adjuster is rotated.

4. The system of claim 1, further comprising a cam extending circumferentially about the first lens, the cam having a profile configured to laterally move the second lens upon rotation of the first lens for parallax correction between the first and second lenses.

5. The system of claim 1, further comprising a spring mechanism between the first and second lens configured to maintain the first and second lenses in parallel with one another.

6. The system of claim 1, wherein gear teeth of the first lens and threads of the focus adjuster are keyed to each other such that parallax correction between the first and second lenses is keyed to a focal distance of the first and second lenses.

7. The system of claim 1, wherein the first lens is a long wave infrared lens and the second lens is a short wave infrared lens.

8. A method for correcting for parallax, the steps, comprising:
   rotating a focus adjuster having a longitudinal axis;
   advancing and retracting a lens retainer along the longitudinal axis in communication with the focus adjuster towards and away from an object of focus;
   rotating a first lens within the lens retainer; and
   simultaneously laterally moving a second lens positioned parallel to the first lens within the lens retainer to correct for parallax between the first and second lenses;
   wherein the focus adjuster includes a set of gear teeth that engages gear teeth of the first lens such that rotation of the focus adjuster causes simultaneous rotation of the first lens and lateral movement of the second lens; and
   wherein the gear teeth of the first lens are a predetermined length to facilitate calibration movement of the first lens based on movement of the focus adjuster.

9. The method of claim 8, wherein the steps of rotating and laterally moving include advancing a cam to force lateral movement of the second lens.

* * * * *